United States Patent
Sukumar et al.

(10) Patent No.: US 10,559,156 B2
(45) Date of Patent: Feb. 11, 2020

(54) METHOD AND SYSTEM FOR DETECTING NATIONALITY OF A FINANCIAL DOCUMENT FROM LAYOUT OF AN INPUT IMAGE OF THE FINANCIAL DOCUMENT

(71) Applicants: Kabushiki Kaisha Toshiba, Minato-ku (JP); Toshiba Infrastructure Systems & Solutions Corporation, Kawasaki-shi (JP)

(72) Inventors: Arya Sukumar, Bangalore (IN); Rajkumar Joseph, Bangalore (IN); Vijaya Kumar Tiruveedhula, Bangalore (IN)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 59 days.

(21) Appl. No.: 15/810,405

(22) Filed: Nov. 13, 2017

(65) Prior Publication Data
US 2019/0147682 A1    May 16, 2019

(51) Int. Cl.
*G06K 9/00* (2006.01)
*G06F 16/903* (2019.01)
*G07D 7/206* (2016.01)

(52) U.S. Cl.
CPC ....... *G07D 7/206* (2017.05); *G06F 16/90335* (2019.01); *G06K 9/00463* (2013.01); *G06K 9/00483* (2013.01)

(58) Field of Classification Search
None
See application file for complete search history.

(56) References Cited

U.S. PATENT DOCUMENTS

| 2008/0069427 A1* | 3/2008 | Liu | G06K 9/34 382/137 |
| 2009/0257641 A1* | 10/2009 | Liu | G07D 7/00 382/135 |
| 2010/0147942 A1 | 6/2010 | Silverbrook et al. | |

FOREIGN PATENT DOCUMENTS

EP    0 660 276 A2    6/1995

* cited by examiner

*Primary Examiner* — Idowu O Osifade
(74) *Attorney, Agent, or Firm* — Oblon, McClelland, Maier & Neustadt, L.L.P.

(57) ABSTRACT

The present subject matter is related in general to image processing that discloses a method for detecting nationality and layout of an input image. A nationality detection system retrieves predefined Financial Document (FD) images based on extracted features of an input image from a database and performs template matching of each predefined FD image with the input image to compute a first layout relevance score for each predefined FD image. Therefore, complexity of performing template matching with every predefined image in the database is eliminated, thereby increasing the processing speed. The nationality detection system detects the nationality and layout of the input image based on highest first layout relevance score if it is greater than or equal to predefined threshold value. Else, the nationality and layout of the input image are detected based on a nationality-based relevance score computed using the first layout relevance score of each predefined FD image.

16 Claims, 12 Drawing Sheets

| Predefined image No. | Predefined FD image | Predefined nationality | First layout relevance score |
|---|---|---|---|
| 1. |  | South Africa | 39% |
| 2. |  | South Africa | 29% |

| | | | |
|---|---|---|---|
| 3. |  | South Africa | 23% |
| 4. |  | India | 22% |
| 5. |  | India | 20% |

| | | | |
|---|---|---|---|
| 6. | [500 Reserve Bank of India note, 6SD 679807] | India | 18% |
| 7. | [1000 Reserve Bank of India note, 3DH 109944] | India | 8% |
| 8. | [One Dollar Federal Reserve Note, K 60498342 D] | USA | 3% |
| 9. | [Two Dollar Federal Reserve Note, K 33473458 D] | USA | 0% |

FIG. 5C

| | | | |
|---|---|---|---|
| 2. |  | India | 22% |
| 3. |  | India | 19% |
| 4. |  | India | 16% |
| 5. |  | India | 11% |

| | | | |
|---|---|---|---|
| 6 |  | USA | 8% |
| 7. |  | USA | 3% |
| 8. |  | South Africa | 2% |

METHOD AND SYSTEM FOR DETECTING NATIONALITY OF A FINANCIAL DOCUMENT FROM LAYOUT OF AN INPUT IMAGE OF THE FINANCIAL DOCUMENT

TECHNICAL FIELD

The present subject matter is related, in general to image processing and more particularly, but not exclusively to a method and a system for detecting nationality and layout of an input image.

BACKGROUND

Currency has utmost significance in our day to day life. Numerous types of the currency exist throughout the world. As an example, types of currency may be rupee, dollar, euro and the like. The currency may vary from country to country in terms of color, size, shape, thickness and other appearance based properties. Further, each type of currency may include different denominations and each denomination may include different versions/forms. Due to the presence of the numerous types of the currency, denominations and versions/forms, counting different denomination notes in a bunch is a challenging as well as a tedious task. Further, recognizing the currencies of various countries is also difficult.

To overcome the challenge of recognizing the currencies, paper currency recognition systems based on pattern recognition were developed. The paper currency recognition systems work in combination with automated cash handling machines to automatically recognize the currencies, count the currencies and convert into other currencies without human supervision. However, the paper currency recognition systems may recognize only pre-stored denominations of the currencies and pre-stored versions/forms of the denominations. Therefore, such machines may not be able to update new denominations of the currencies and new versions/forms of the new denominations dynamically, thereby leading to delay in performing operations such as counting the currencies, converting into other currencies and the like. Further, since different currencies have different security features, developing a single system for recognizing any type of currency is a challenge. Alternatively, developing a separate system for recognizing each type of currency is also a tedious process.

Existing techniques include a method of counting and validating the value of the currency by sensing at least one coded tag printed on the currency document. By sensing the coded tag, a unique identity of the currency may be obtained based on which a value corresponding to the currency may be determined. A few other existing techniques recognize the currency based on probabilistic neural networks. However, the existing techniques concentrate only on differentiating currency documents such as bank notes within a single nation or limited number of nations for limited types of currency based on criteria like denomination, year of printing and the like. Further, the existing techniques concentrate on sorting the currency documents of a particular nationality based on the denomination. None of the existing techniques concentrate on managing currency documents whose nationality is unknown to the system.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

The present disclosure provides an image processing method. The image processing method comprises receiving, by a nationality detection system, an input image of a financial document (FD). Upon receiving the input image, the nationality detection system retrieves one or more, predefined FD images based on one or more extracted features of the input image from a database associated with the nationality detection system. Each of the one or more predefined FD images is associated with a predefined nationality. Further, the nationality detection system performs one or more pre-processing steps on each of the one or more predefined FD images to obtain a first layout relevance score for each of the one or more predefined FD images. Furthermore, when a highest first layout relevance score among the first layout relevance score for each of the one or more predefined FD images is less than a predefined threshold value, the nationality detection system performs steps of computing a nationality-based relevance score based on the first layout relevance score of each of the one or more predefined PD images for each predefined nationality associated with each of the one or more predefined PD images. Further, the nationality detection system compares a layout of the input image with a predefined layout of each predefined FD image of the predefined nationality having a highest nationality-based relevance score. Upon comparing, for each of the one or more predefined FD images of the predefined nationality having the highest nationality-based relevance score, the nationality detection system computes a second layout relevance score based on the comparison and obtains a highest second layout relevance score among the second layout relevance score of each of the one or more predefined FD images. Finally, the nationality detection system detects nationality and layout of the input image based on the predefined nationality and the predefined layout of the predefined FD image having the highest second layout relevance score, when the highest second layout relevance score is greater than or equal to the predefined threshold value.

Further, the present disclosure comprises a nationality detection system. The nationality detection system comprises a processor and a memory communicatively coupled to the processor. The memory stores the processor-executable instructions, which, on execution, causes the processor to receive an input image of a financial document (FD). Further, from a database associated with the nationality detection system the processor retrieves one or more predefined FD images based on one or more extracted features of the input image. Each of the one or more predefined FD images is associated with a predefined nationality. Furthermore, the processor performs one or more pre-processing steps on each of the one or more predefined FD images to obtain a first layout, relevance score for each of the one or more predefined FD images. Upon performing the one or more pre-processing steps, when a highest first layout relevance score, among the first layout relevance score for each of the one or more predefined FD images, is less than a predefined threshold value, the processor performs the steps of computing a nationality-based relevance score based on the first layout relevance score of each of the one or more predefined FD images for each predefined nationality associated with each of the one or more predefined FD images. Further, the processor compares a layout of the input image with a predefined layout of each predefined FD image of the predefined nationality having a highest nationality-based relevance score. Furthermore, for each of the one or more predefined FD images of the predefined nationality having the highest nationality-based relevance score, the processor computes a second layout relevance score based on the comparison and obtains a highest second layout relevance score among the second layout relevance score of each of the one or more predefined FD images. Finally, the processor detects nationality and layout of the input image based on the predefined nationality and the predefined layout of the predefined FD image having the highest second layout relevance score, when the highest second layout relevance score is greater than or equal to the predefined threshold value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 5A:
Figure 5A:
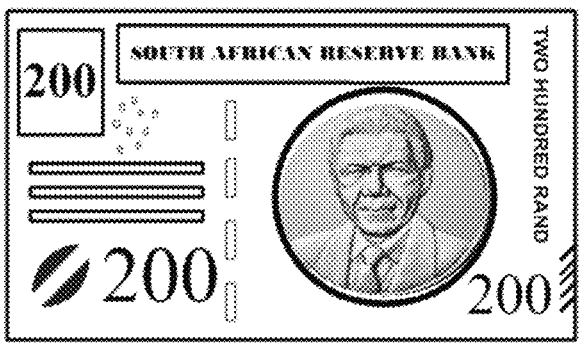
Figure 5B:
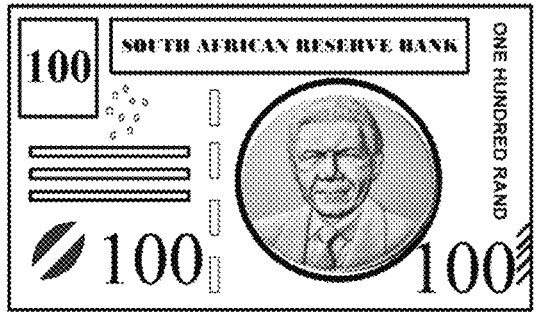
Figure 5B:
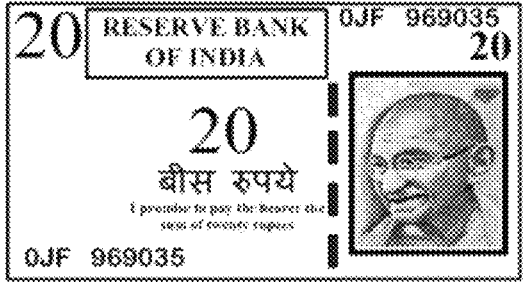
Figure 5B:
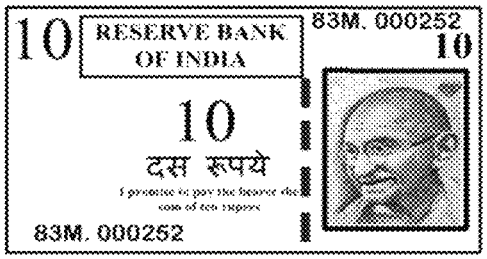

FIG. 5A-5C each describes a layout relevant score computed for a FD image in association with a nationality in accordance with an embodiment of the present disclosure.

Figure 6A:
Figure 6B:
Figure 6B:
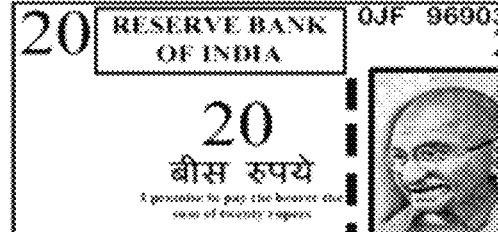
Figure 6B:
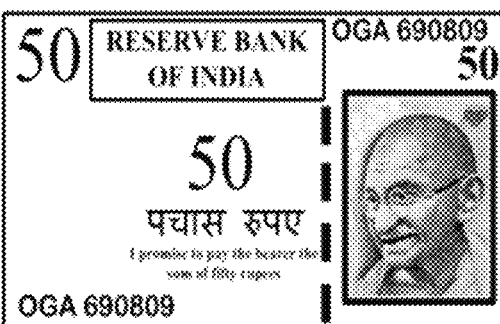
Figure 6B:
Figure 6C:
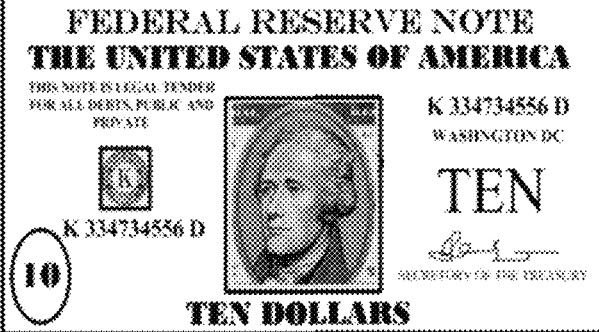
Figure 6C:
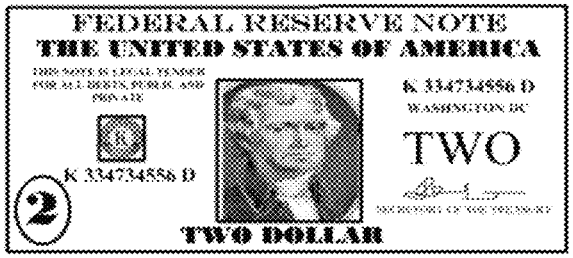
Figure 6C:
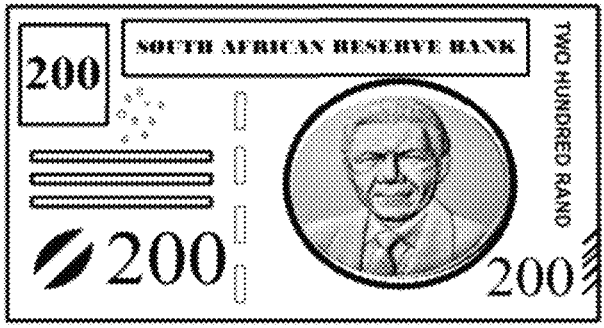

FIG. 6A-6C each describes a layout relevant score computed for a FD image in association with a nationality in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or in of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides an image processing method and a nationality detection system for detecting nationality and layout of an input image. The nationality detection system receives an input image of the FD. Upon receiving the input image, the nationality detection system retrieves one or more predefined FD images based on one or more extracted features of the input image from a database associated with the nationality detection system. Each of the one or more predefined FD images is associated with a predefined nationality. Further, the nationality detection system performs one or more pre-processing steps on each of the one or more predefined FD images to obtain a first layout relevance score for each of the one or more predefined FD images. The one or more pre-processing steps may include comparing layout of the input image with predefined layout of each of the one or more predefined FD images to obtain the first layout relevance score. The comparison includes performing template matching only with the one or more predefined images that are selected as a near match to the input image based on the one or more extracted features. Therefore, complexity of performing template matching with every predefined image in the database is eliminated, thereby increasing the processing speed.

Among the first layout relevance score computed for each of the one or more predefined FD images, if a highest first layout relevance score is greater than or equal to a predefined threshold value, the nationality detection system detects nationality and layout of the input image as the predefined nationality and predefined layout of the predefined FD image corresponding to the highest first layout relevance score. Furthermore, when the highest first layout relevance score among the first layout relevance score of each of the one or more predefined FD images is less than a predefined threshold value, the nationality detection system computes a nationality-based relevance score. The nationality-based relevance score is based on the first layout relevance score of each of the one or more predefined FD images for each predefined nationality associated with each of the one or more predefined FD images. Further, the nationality detection system compares the layout of the input image with the predefined layout of each of the one or more predefined FD images of the predefined nationality having a highest nationality-based relevance score. Upon comparing, for each of the one or more predefined FD images of the predefined nationality having the highest nationality-based relevance score, the nationality detection system computes a second layout relevance score based on the comparison and obtains a highest second layout relevance score among the second layout relevance score of each of the one or more predefined FD images.

Finally, the nationality detection system detects nationality and layout of the input image based on the predefined nationality and the predefined layout of the predefined FD image having the highest second layout relevance score, when the highest second layout relevance score is greater than or equal to the predefined threshold value. Therefore, the present disclosure can detect the nationality of a new FD without any updation in the nationality detection system. Further, the present disclosure can detect the nationality and the layout of an input image by processing a partial image of the FD as well. Processing the partial image reduces computation complexity, thereby increasing efficiency of the nationality detection system.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
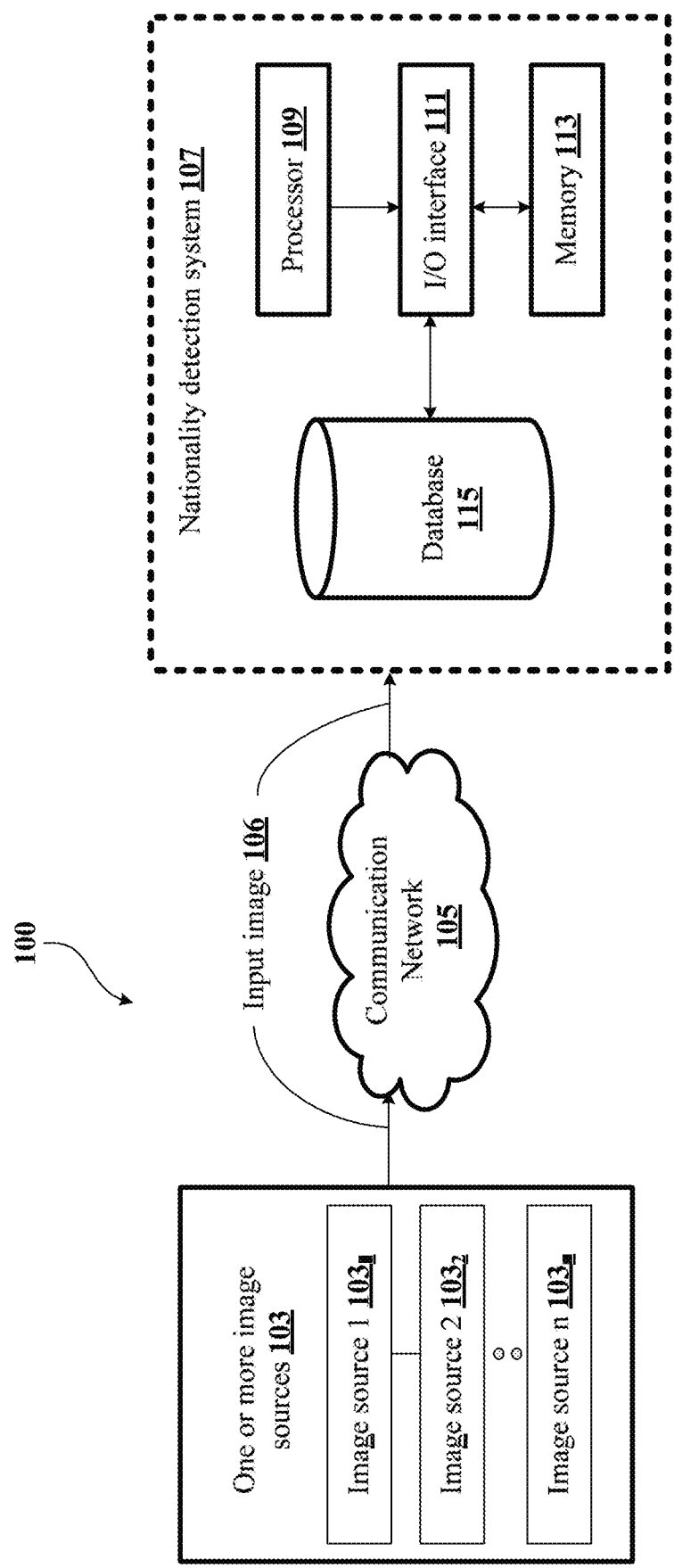
FIG. 1 shows an exemplary architecture for detecting nationality and layout of an input image in accordance with some embodiments of the present disclosure.

FIG. 1 shows an exemplary architecture for detecting nationality and layout of an input image in accordance with some embodiments of the present disclosure.

The architecture 100 comprises one or more image sources, image source 1 103$_1$ to data image n 103$_n$ (collectively referred to as one or more image sources 103), a communication network 105 and a nationality detection system 107. As an example, the one or more image sources 103 may include, but not limited to, an image repository and an image capturing device such as a camera, a mobile, a tablet and the like. The one or more image sources 103 communicate with the nationality detection system 107 through the communication network 105. As an example, the communication network 105 may be at least one of a wired communication network and a wireless communication network.

The nationality detection system 107 comprises a processor 109, an Input/output (I/O) interface 111, a memory 113 and a database 115. In an embodiment, the I/O interface 111 receives an input image 106 of a Financial Document (FD) from the one or more image sources 103. As an example, the FD may be a currency such as a bank note, non-paper currency such as coin and the like. Upon receiving the input image 106, the processor 109 extracts one or more features of the input image 106. As an example, the one or more extracted features may include, but not limited to, colour histogram, colour values and edge detection. Further, the processor 109 retrieves one or more predefined FD images based on the one or more extracted features of the input image 106. In an embodiment, the one or more predefined FD images are retrieved from the database 115 associated with the nationality detection system 107. In as embodiment, the database 115 may be present within the nationality detection system 107 or may be externally associated with the nationality detection system 107. In an embodiment, each of the one or more predefined images is associated with a predefined nationality. As an example, the predefined nationality may be India, Australia, SriLanka, China and the like. Upon retrieving the one or more predefined FD images, the processor 109 obtains a first layout relevance score for each of the one or more predefined FD images by performing one or more pre-processing steps. Further, the processor 109 compares a highest first layout relevance score among the first layout relevance score for each of the one or more predefined FD images with a predefined threshold value. If the highest first layout relevance score is greater than or equal to the predefined threshold value, the processor 109 detects nationality and layout of the input image 106 as the predefined nationality and predefined layout of the predefined FD image corresponding to the highest first layout relevance score. If the highest first layout relevance score is less than the predefined threshold value, for each predefined nationality associated with each of the one or more predefined FD images, the processor 109 computes a nationality-based relevance score based on the first layout relevance score of each of the one or more predefined FD images. The processor 109 detects the nationality and the layout of the input image 106 utilizing the nationality-based relevance score. The method of detecting the nationality and the layout of the input image 106 utilizing the nationality based relevance score is described further in the disclosure.

Figure 2A:
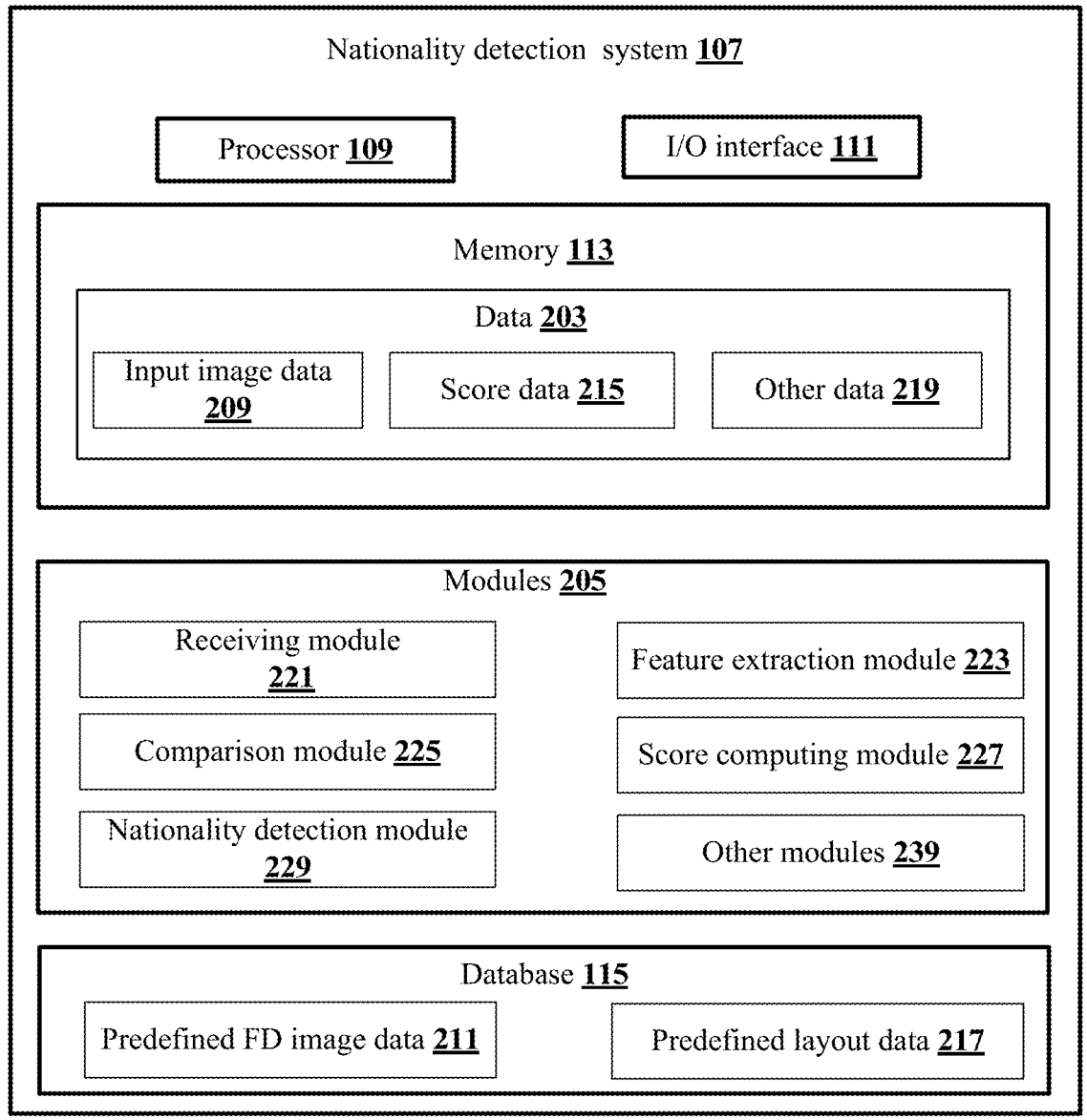
FIG. 2A shows a detailed block diagram of a nationality detection system for detecting nationality and layout of an input image in accordance with some embodiments of the present disclosure.

FIG. 2A shows a detailed block diagram of a nationality detection system for detecting nationality and layout an input image in accordance with some embodiments of the present disclosure.

In one implementation, the nationality detection system 107 comprises data 203 and modules 205. As an example, the data 203 may be stored in the memory 113 configured in the nationality detection system 107. In one embodiment, the data 203 comprises an input image data 209, a score data 215 and other data 219. In the illustrated FIG. 2A, the modules 205 are described here in detail. Further, the nationality detection system 107 comprises a database 115 that may include a predefined FD image data 211 and a predefined layout data 217.

In one embodiment, the data 203 may be stored in the memory 113 in the form of various data structures. Additionally, the data 203 can be organized using data models, such as relational or hierarchical data models. The other data 219 may store data, including temporary data and temporary files, generated by the modules 205 for performing the various functions of the nationality detection system 107.

In an embodiment, the data 203 stored in the memory 113 may be processed by the modules 205 of the nationality detection system 107. The modules 205 may be stored within the memory 113. In an example, the modules 205, communicatively coupled to a processor 109 configured in the nationality detection system 107, may also be present outside the memory 113 as shown in FIG. 2A and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a receiving module 221, a feature extraction module 223, a comparison module 225, a score computing module 227, a nationality detection module 229 and other modules 233. The other modules 233 may be used to perform various miscellaneous functionalities of the nationality detection system 107. It will be appreciated that such modules 205 may be represented as a single module or a combination of different modules.

In some embodiments, the receiving module 221 may receive an input image 106 of a Financial Document (FD) from one or more image sources 103. As an example, the FD may be a currency such as a bank note, coin and the like. As an example, the one or more image sources 103 may include, but not limited to, an image repository and an image capturing device such as a camera, a mobile, a tablet and the like. In an embodiment, the input image 106 received may be a complete image of the FD or a partial image of the FD. The input image 106 received by the receiving module 221 may be stored as the input image data 209.

In some embodiments, the feature extraction module 223 may extract one or more features of the input image 106. As an example, the one or more extracted features may include, but not limited to, colour histogram, colour values and edge detection. The one or more extracted features of the input image 106 may also be stored as the input image data 209.

In some embodiments, the comparison module 225 may compare each of the one or more extracted features of the input image 106 with the predefined extracted features of the one or more predefined FD images. In an embodiment, the one or more predefined FD images and the corresponding predefined extracted features are stored as the predefined FD image data 211. As an example, the predefined extracted features may include, but not limited to, colour histogram, colour values and edge detection. The predefined extracted features may be indexed and stored with the corresponding one or more predefined FD images as the predefined FD image data 211 in the database 115. In an embodiment, each of the one or more predefined FD image is further associated with a predefined nationality. As an example, the predefined nationality may be India, Australia, SriLanka, China and the like. Based on the comparison, the comparison module 225 identities the one or more predefined FD images such that the predefined extracted features of the one or more predefined FD images may be a near match to the one or more extracted features of the input image 106. The comparison module 225 retrieves the identified one or more predefined FD images including the predefined extracted features of the corresponding predefined FD image and the corresponding predefined nationality. As an example, consider the predefined FD image data 211 comprises 100 predefined FD images. Based on the comparison, the comparison module 225 may identify top 10 predefined FD images and retrieve only the top 10 predefined images from the 100 predefined FD images.

In some embodiments, the score computing module 227 may obtain a first layout relevance score for each of the one or more predefined FD images retrieved by the comparison module 225. The score computing module 227 performs one or more pre-processing steps on each of the one or more predefined FD images to obtain the first layout relevance score. As part of the one or more pre-processing steps, the score computing module 227 compares a layout of the input intuit 106 with a predefined layout of each of the one or more predefined FD images. The predefined layout of each of the one or more predefined FD images may be stored as the predefined layout data 217 in the database 115. Each predefined layout of each of the one or more predefined FD images is associated with the predefined nationality. Further each predefined layout may include layout features such as portrait, position of the portrait, symbols, position of serial number, format of the serial number, denomination and the like. In an embodiment, the denomination may also be dynamically extracted by the feature extraction module 223. Based on the comparison, the score computing module 227 computes a first layout relevance score for each of the one or more predefined FD images. In an embodiment, the first layout relevance score indicates level of relevancy of the layout of each predefined FD image with the layout of the input image 106. The first layout relevance score of each of the one or more predefined FD images is stored as the score data 215. Further, the score computing module 227 obtains the highest first layout relevance score among the first layout relevance score of each of the one or more predefined FD images.

In some embodiment, the nationality detection module 229 may detect nationality and layout of the input image 106. The nationality detection module 229 compares the highest first layout relevance score obtained by the score computing module 227 with a predefined threshold value. As an example, the predefined threshold value may be set as 75%. If the highest first layout relevance score is greater than or equal to the predefined threshold value, the nationality detection module 229 obtains the predefined FD image and the predefined layout corresponding to the highest first layout relevance score. Further, the nationality detection module 229 detects the nationality and the layout of the input image 106 as the predefined nationality and the predefined layout of the predefined FD image corresponding to the highest first layout relevance score. In one embodiment, the predefined threshold value may be changed as per requirement of various banking applications and design of the nationality detection system 107.

In an embodiment, if the highest first layout relevance score is less than the predefined threshold value, the nationality detection module 229 activates the score computing module 227 to compute a nationality-based relevance score for each of the one or more predefined images. In an embodiment, the nationality-based relevance score indicates relevancy of the predefined nationality to the input image 106. The nationality-based relevance score may be computed based on the highest first layout relevance score of each of the one or more predefined FD images. As an example, the score computing module 227 may use predefined equation as shown in the below Equation 1 to compute the nationality-based relevance score.

$$\text{Nationality-based relevance score} = \frac{\text{sum(first layout relevance score of a predefined nationality)}}{\text{sum(first layout relevance score of the all the predefined nationalities)}} * 100 \quad \text{Equation 1}$$

Further, the score computing module 227 selects a highest nationality-based relevance score among the nationality-based relevance score computed for each of the one or more predefined images. Upon identifying the highest nationality-based relevance score, the nationality detection module 229 obtains the one or more predefined FD images retrieved by the comparison module 225 associated with the predefined nationality corresponding to the highest nationality-based relevance score. The score computing module 227 compares the layout of the input image 106 with the predefined layout of each of the one or more predefined FD images corresponding to the predefined nationality having a highest nationality-based relevance score. Based on the comparison, the score computing module 227 may compute a second layout relevance score for each of the one or more predefined FD images of the predefined nationality having the highest nationality-based relevance score. In art embodiment, the score computing module 227 may retrieve the respective first layout relevance scores of each of the one or more predefined PD images and assign them as the second layout relevance scores. Further, the score computing module 227 obtains a highest second layout relevance score among the second layout relevance score of each of the one or more predefined FD images. Upon obtaining the highest second layout relevance score, the score computing module 227 activates the nationality detection module 229 to detect the nationality and layout of the input image 106. In an embodiment, the nationality detection module 229 compares the highest second layout relevance score with the predefined threshold value. If the highest second layout relevance score is greater than or equal to the predefined threshold value, the nationality detection module 229 detects the nationality and the layout of the input image 106 as the predefined nationality and the predefined layout of the predefined FD image having the highest second layout relevance score respectively.

If the highest second layout relevance score is less than the predefined threshold value, the nationality detection module 229 activates the score computing module 227 to further compute a subsequent second layout relevance score for each of the one or more predefined images corresponding to subsequent highest nationality-based relevance score. The subsequent second layout relevance score is obtained by comparing the layout of the input image 106 with the predefined layout of each of the one or more predefined FD images corresponding to the predefined nationality having the subsequent highest nationality based relevance score. Further, the score computing module 227 obtains a subsequent highest second layout relevance score among the subsequent second layout relevance score of each of the one or more predefined FD images corresponding to the predefined nationality having the subsequent highest nationality based relevance score. Furthermore, upon obtaining the subsequent highest second layout relevance score by the score computing module 227, the nationality detection module 229 is activated to detect the nationality and layout of the input image 106 as described above. In an embodiment, this process repeats until the subsequent highest second layout relevance score corresponding to one of the predefined nationalities with the subsequent highest nationality-based relevance score is greater than or equal to the predefined threshold value.

In an embodiment, if the subsequent highest second layout relevance score corresponding to the predefined nationalities is less than the predefined threshold value, the nationality detection module 229 assigns the predefined nationality having the highest nationality-based relevance score as the nationality of the input image 106. Further, the nationality detection module 229 uploads the layout of the input image 106 as a new layout associated with the corresponding nationality in the database 115.

Upon detecting the nationality and the layout of the input image 106, the nationality detection module 229 performs one or more operations related to a financial institution. As an example, the financial institution may be a bank, an insurance company, a chit fund company and the like. As an example, the one or more operations of the financial institution may include, but not limited to, segregating the FDs, counting, the FDs, identifying denomination of the FDs and eliminating soiled FDs.

Figure 2B:
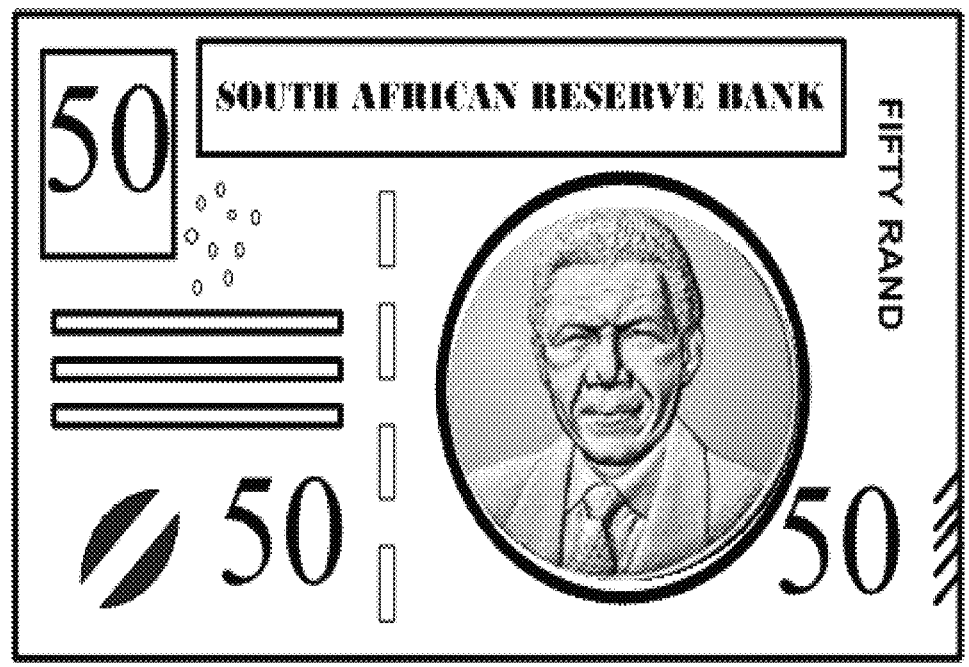
FIG. 2B and FIG. 2C shows an exemplary input image of a Financial Document (FD) in accordance with some embodiments of the present disclosure.

Consider an exemplary scenario where an exemplary input image 1 is received as shown in the FIG. 2B. The feature extraction module 223 extracts one or more features from the exemplary input image 1. Further, the comparison module 225 compares the one or more extracted features with the predefined extracted features of the one or more predefined FD images. Upon comparing, the comparison module 225 identifies one or more exemplary predefined FD images as shown in FIGS. 5A-5C. The identified one or more exemplary predefined FD images comprise 3 FD images corresponding to the predefined nationality "South Africa", 4 FD images corresponding to the predefined nationality "India" and 2 FD images corresponding to the predefined nationality "United States of America (USA)". Further, the score computing module 227 computes first layout relevance score for each of the identified one or more exemplary predefined FD images by comparing a layout of the exemplary input image 1 with the predefined layout of each of the identified one or more exemplary predefined FD images. Consider the first layout relevance score computed for each of the identified one or more exemplary predefined FD images as shown in FIGS. 5A-5C.

Consider the predefined threshold value is 75%. In FIGS. 5A-5C, a highest first layout relevance score belongs to the predefined image number 1 having the predefined nationality "South Africa" and the first layout relevance score "39%". The highest first layout relevance score is less than the predefined threshold value. Therefore, the score computing module 227 computes a nationality-based relevance score for each predefined nationality corresponding to each of the identified one or more exemplary predefined FD images using the Equation 1. According to the Equation 1, $$\text{Nationality-based relevance score} = \frac{\text{sum(first layout relevance score of a predefined nationality)}}{\text{sum(first layout relevance score of the all the predefined nationalities)}} * 100$$

Therefore, the nationality-based relevance score of the predefined nationality "South Africa" is computed based on the Equation 1 as shown below in the Equation 2.

$$\text{Nationality-based relevance score of South Africa} = \frac{\text{sum(first layout relevance score of South Africa)}}{\text{sum(first layout relevance score of the all the predefined nationalities)}} * 100 \quad \text{Equation 2}$$

The score computing module 227 substitutes the respective values from FIGS. 5A-5C in the Equation 2 as shown below.

$$\text{Nationality-based relevance score of South Africa} = \frac{\text{sum}(39+29+23)}{\text{sum}(39+29+23+22+20+18+8+3+0)} * 100 = 56\%$$

Therefore, the nationality-based relevance score computed for the predefined nationality "South Africa" is 56%. Similarly, the nationality-based relevance score computed for the predefined nationality "India" is 42% and "USA" is 2%.

The highest nationality-based relevance score belongs to the predefined nationality "South Africa". Therefore, a second layout relevance score computed for each of the identified one or more exemplary predefined FD images corresponding to the predefined nationality having the highest nationality-based relevance score i.e. "South Africa". Consider the second layout relevance score of each of the identified one or more exemplary predefined FD images corresponding to the predefined nationality "South Africa" as shown in the below Table 2.

TABLE 2

| Predefined image No. | Predefined nationality | Second layout relevance score |
|---|---|---|
| 1. | South Africa | 39% |
| 2. | South Africa | 29% |
| 3. | South Africa | 23% |

In the above Table 2, a highest second layout relevance score belongs to the predefined image number 1 having the predefined nationality. "South Africa" and the second layout relevance score "39%". The highest second layout relevance score is less than the predefined threshold value. Therefore, the score computing module 227 computes subsequent second layout relevance score i.e. third layout relevance score considering the one or more exemplary predefined FD images of the predefined nationality corresponding to the subsequent highest nationality-based relevance score i.e. "India" as shown in below Table 3.

TABLE 3

| Predefined image No. | Predefined nationality | Third layout relevance score |
|---|---|---|
| 1. | India | 22% |
| 2. | India | 20% |
| 3. | India | 18% |
| 4. | India | 8% |

In the above Table 3, a highest third layout relevance score belongs to the predefined image number 1 having the predefined nationality "India" and the second layout relevance score "22%". The highest third layout relevance score is less than the predefined threshold value. Therefore, the score computing module 227 computes the subsequent second layout relevance score i.e. a fourth layout relevance score considering the one or more exemplary predefined FD images of the predefined nationality corresponding to the subsequent highest nationality-based relevance score i.e. "USA" as shown in below Table 4.

TABLE 4

| Predefined image No. | Predefined nationality | Fourth layout relevance score |
|---|---|---|
| 1. | USA | 3% |
| 2. | USA | 0% |

In the above Table 4, a highest fourth layout relevance score belongs to the predefined image number 1 having the predefined nationality "USA" and the fourth layout relevance score "3%". The highest fourth layout relevance score is less than the predefined threshold value. Therefore, the nationality detection module 229 detects the predefined nationality "South Africa" as the nationality of the exemplary input image 1 based on the highest nationality-based relevance score. Further, the layout of the exemplary input image 1 is updated in the database 115 as a new layout since none of the predefined layouts matched with the layout of the exemplary input image 1.

Furthermore, the nationality detection system 107 performs the one or more operations of the financial institution upon detecting the nationality and the layout of the exemplary input image 1.

In the exemplary scenario, if the highest first layout relevance score was greater than the predefined threshold, then the predefined nationality "South Africa" and the predefined layout of the exemplary predefined FD image corresponding to the highest first layout relevance score will be considered as the nationality and the layout of the exemplary input image 1.

Figure 2C:
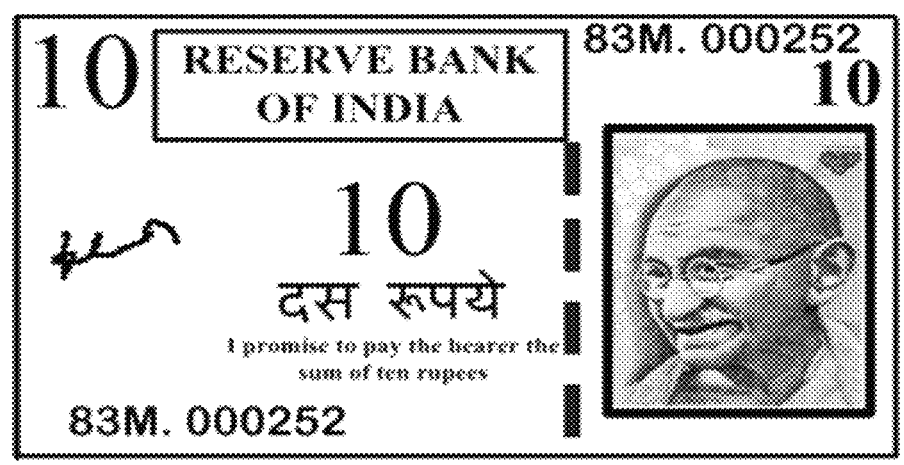

Consider an exemplary scenario where an exemplary input image 2 is received as shown in the FIG. 2C. The exemplary input image 2 is a soiled image. The feature extraction module 223 extracts one or more features from the exemplary input image 2. Further, the comparison module 225 compares the one or more extracted features with the predefined extracted features of the one or more predefined FD images 211. Upon comparing, the comparison module 225 identifies one or more exemplary predefined FD images as shown in FIGS. 6A-6C. The identified one or more exemplary predefined FD images comprise 5 FD images corresponding to the predefined nationality "India", 1 FD image corresponding to the predefined nationality "South Africa" and 2 FD images corresponding to the predefined nationality "United States of America (USA)". Further, the score computing module 227 computes a first layout relevance score for each of the identified one or more exemplary predefined FD images by comparing a layout of the exemplary input image 2 and the predefined layout of each of the identified one or more exemplary predefined FD images. Consider the first layout relevance score computed for each of the identified one or more exemplary predefined FD images as shown in FIGS. 6A-6C.

Consider the predefined threshold value is 75%. In FIGS. 6A-6C, a highest first layout relevance score belongs to the predefined image number 1 having the predefined nationality "India" and the first layout relevance score "100%". In an embodiment, the first layout relevance score "100%" means that the database 115 has detected a predefined FD image of the same layout, nationality, denomination which is significantly soiled. The highest first layout relevance score is greater than the predefined threshold value. Therefore, the predefined nationality "India" and the predefined layout of the exemplary predefined FD image corresponding to the highest first layout relevance score will be considered as the nationality and the layout of the exemplary input image 2. In FIGS. 6A-6C, the predefined FD image 2 is same as the exemplary input image 2. However, the first layout relevance score of the predefined FD image 2 is 22% since the predefined FD image represents an unsoiled version of the exemplary input image 2. Due to the presence of a predefined FD image 1 representing a soiled version of the exemplary input image 2 in the database 115, the predefined FD image 2 is given a lower first layout relevancy score compared to the predefined FD image 1.

Figure 3A:
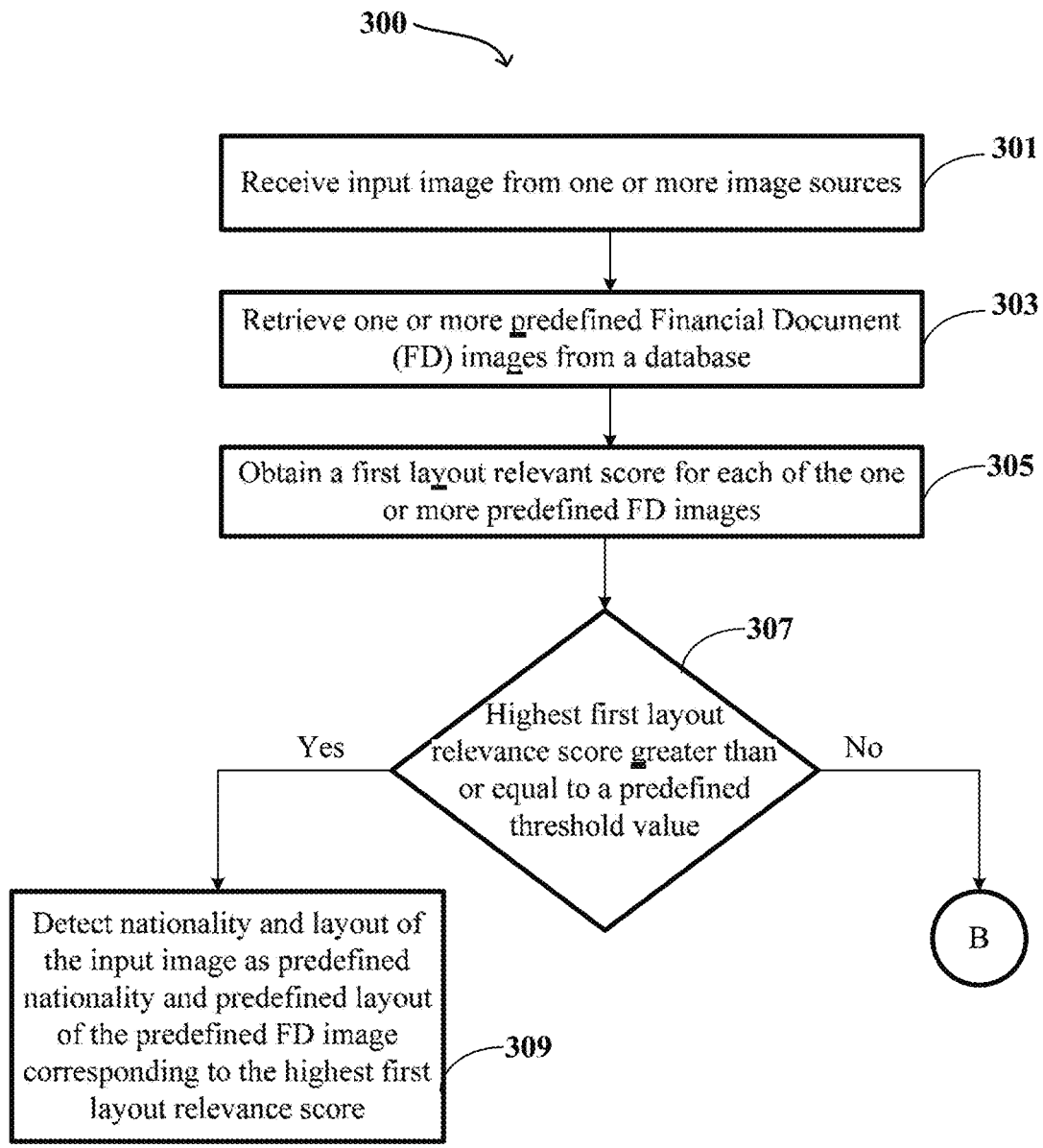
FIG. 3A and FIG. 3B illustrate a flowchart showing method for detecting nationality and layout of an input image in accordance with some embodiments of the present disclosure.
Figure 3B:
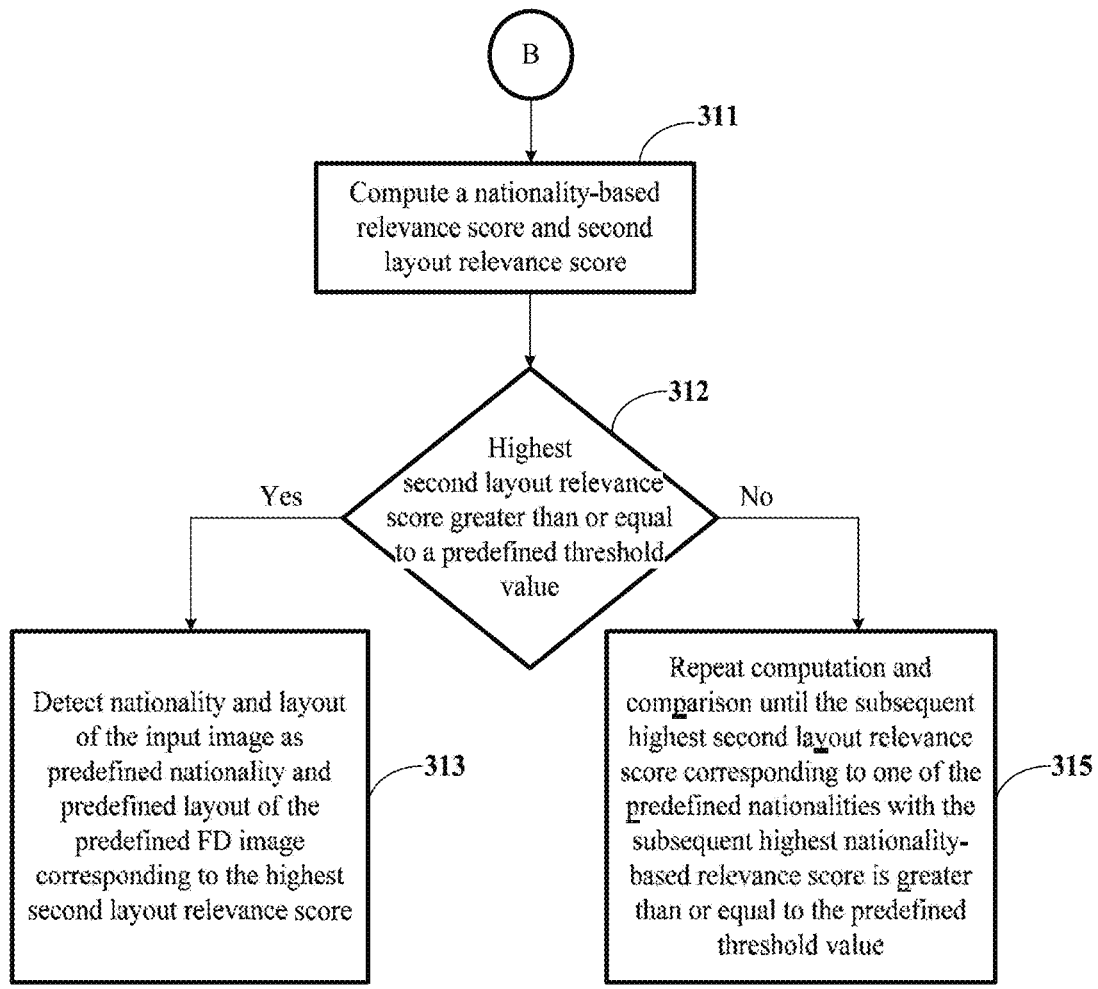

FIG. 3A and FIG. 3B illustrate a flowchart showing method for detecting nationality and layout of an input image in accordance with some embodiments of the present disclosure.

As illustrated in FIG. 3A and FIG. 3B, the method 300 comprises one or more blocks illustrating method for detecting nationality and layout of an input image 106. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 301, a processor 109 of the nationality detection system 107 may receive an input image 106 of a Financial Document (FD) from one or more image sources 103. As an example, the one or more image sources 103 may include, but not limited to, an image repository and an image capturing device such as a camera, a mobile, a tablet and the like.

At block 303, the processor 109 may retrieve one or more predefined FD images from a database 115 associated with the nationality detection system 107. In an embodiment, the processor 109 may extract one or more features of the input image 106. As an example, the one or more extracted features may include, but not limited to, colour histogram, colour values and edge detection. Further, the processor 109 may compare each of the one or more extracted features of the input image 106 with predefined extracted features of the corresponding predefined SD image. Based on the comparison, the processor 109 retrieves the one or more predefined FD images that may be a near match to the one or more extracted features of the input image 106.

At block 305, the processor 109 may obtain a first layout relevance score for each of the one or more predefined FD images. In an embodiment, the processor 109 performs one or more pre-processing steps on each of the one or more predefined FD images. The one or more pre-processing steps may include comparing a layout of the input image 106 with a predefined layout of each of the one or more predefined FD images. Based on the comparison, the processor 109 computes a first layout relevance score for each of the one or more predefined FD images. In an embodiment, the first layout relevance score indicates level of relevancy of the layout of each predefined FD image with the one or more predefined layouts.

At block 307, the processor 109 checks a condition to see if a highest first layout relevance score is greater than or equal to a predefined threshold value. If the highest first layout relevance score is greater than or equal to a redefined threshold value, the method 300 proceeds to block 309 via "Yes". If the highest first layout relevance score is less than a predefined threshold value, the method 300 proceeds to block 311 via "No" and "B".

At block 309, the processor 109 detects the nationality and the layout of the input image 106 as the predefined nationality and the predefined layout of the predefined FD image corresponding to the highest first layout relevance score.

At block 311, the processor 109 computes a nationality-based relevance score for each predefined nationality associated with each of the one or more predefined FD images. The nationality-based relevance score may be computed based on the highest first layout relevance score of each of the one or more predefined FD images. Further, the processor 109 computes a second layout relevancy score for each of the one or more predefined FD images belonging to the predefined nationality corresponding to a highest nationality-based relevancy score.

At block 312, the processor 109 checks a condition to see if a highest second layout relevance score is greater than or equal to the predefined threshold value. If the second layout relevancy score is greater than or equal to the predefined threshold value, the method 300 proceeds to block 313 via "Yes". If the second layout relevancy score is less than the predefined threshold value, the method 300 proceeds to block 315 via "No".

At block 313, the processor 109 detects the nationality and the layout of the input image 106 as the predefined nationality and the predefined layout of the predefined FD image corresponding to the highest second layout relevance score.

At block 315, the processor 109 repeats the computing step and the comparison with a predefined threshold value step described in the block 311 score for each of the one or more predefined FD images belonging to the predefined nationality corresponding to a subsequent highest nationality-based relevancy score. The processor 109 repeats the computing step and the comparing step until the subsequent highest second layout relevance score corresponding to one of the predefined nationalities with the subsequent highest nationality-based relevance score is greater than or equal to the predefined threshold value.

At block 316, the processor 109 may assign the predefined nationality having the highest nationality-based relevance score as the nationality of the input image 106. Further, the Processor 199 may upload the layout of the input image 106 as a new layout associated with the corresponding nationality in the database 115.

Figure 4:
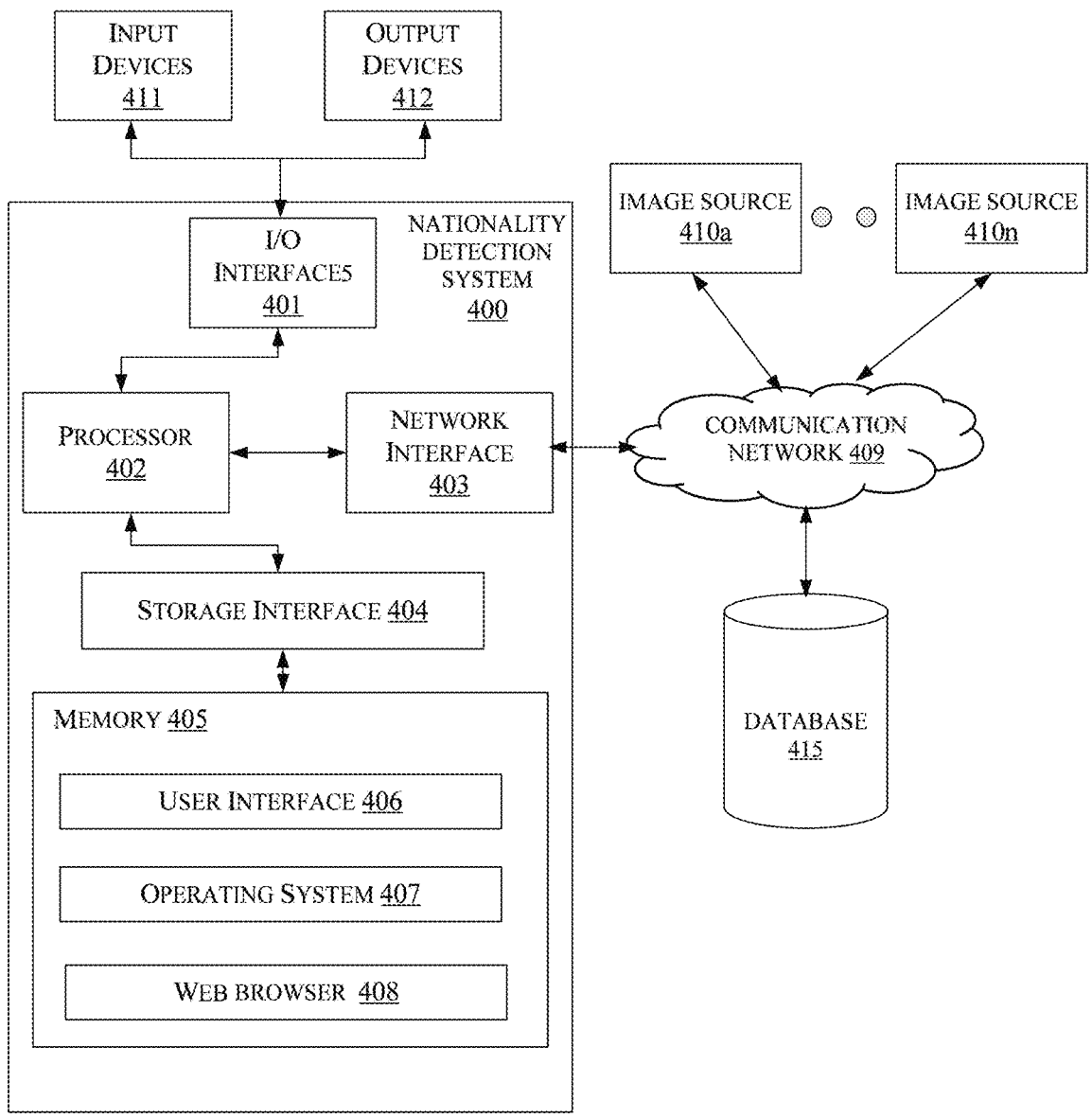
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, a nationality detection system 400 is used for detecting nationality and layout of an input image 106. The nationality detection system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the nationality detection system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the nationality detection system 400 may communicate with one or more image sources 410 ($a, \ldots, n$) and a database 415. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one, or more image sources 410 ($a, \ldots, n$) may include, but not limited to, an image repository and an image capturing device such as a camera, a mobile, a tablet and the like.

In some embodiments, the processor 402 may be disposed in communication with a memory 405 (e.g., RAM, ROM, etc, not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical, drive, optical drive, Redundant Array of Independent Discs (RAID), solid-state memory devices, solid-state drives, etc.

The memory 405 may store a collection of program or database components, including, without limitation, user interface 406, an operating system 407, web server 408 etc. In some embodiments, the nationality detection system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the nationality detection system 400. Examples of operating systems include, without limitation, Apple Macintosh OS X, UNIX, Unix-like system distributions (e.g., Berkeley Software Distribution (BSD), FreeBSD, NetBSD, OpeaBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the nationality detection system 400, such as cursors, icons, check boxes, menus, scrollers, windows, widgets, etc. Graphical User Interfaces (GUIs) may be employed, including, without limitation, Apple Macintoth operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the nationality detection system 400 may implement a web browser 408 stored program component. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming interfaces (APIs), etc. In some embodiments, the nationality detection system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the nationality detection system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an enabodithent, the present disclosure provides a method and a system for detecting nationality and layout of an input image.

The present disclosure provides a feature wherein the nationality a new FD can be detected and the new FD is recognised by the system without any updation in the nationality detection system.

The present disclosure performs template matching only with the one or more predefined images that are selected as a near match to the input image based on extracted features. Therefore, complexity of performing template matching with all the one or more predefined images in the database is eliminated, thereby increasing the processing speed.

The present disclosure provides a feature wherein a partial image of the FD is accepted as the input image that reduces computation complexity.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for detecting nationality and layout of an input image. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. An image processing method comprising:
receiving, by a nationality detection system, an input image of a financial document (FD);
retrieving, by the nationality detection system, from a database associated with the nationality detection system, one or more predefined FD images based on one or more extracted features of the input image, wherein each of the one or more predefined FD images is associated with a predefined nationality;
performing, by the nationality detection system, one or more pre-processing steps on each of the one or more predefined FD images to obtain a first layout relevance score for each of the one or more predefined FD images;
performing, by the nationality detection system, when a highest first layout relevance score, among the first layout relevance score for each of the one or more predefined FD images, is less than a predefined threshold value, steps of:
for each predefined nationality associated with each of the one or more predefined FD images, computing, by the nationality detection system, a nationality-based relevance score based on the first layout relevance score of each of the one or more predefined FD images;
comparing, by the nationality detection system, a layout of the input image with a predefined layout of each of the one or more predefined FD images corresponding to a predefined nationality having a highest nationality-based relevance score;
for each of the one or more predefined FD images of the predefined nationality having the highest nationality-based relevance score, computing, by the nationality detection system, a second layout relevance score based on the comparison;
obtaining a highest second layout relevance score among the second layout relevance score of each of the one or more predefined FD images; and
detecting, by the nationality detection system, a nationality and the layout of the input image based on the predefined nationality and the predefined layout of a predefined FD image having the highest second layout relevance score, when the highest second layout relevance score is greater than or equal to the predefined threshold value,
repeating, by the nationality detection system, when the highest second layout relevance score is less than the predefined threshold value, steps of comparing, computing and detecting for a predefined nationalities with subsequent highest nationality-based relevance score consecutively until a subsequent highest second layout relevance score corresponding to one of the predefined nationalities with the subsequent highest nationality-based relevance score is greater than or equal to the predefined threshold value; and
performing, by the nationality detection system, when the subsequent highest second layout relevance score corresponding to the predefined nationalities is less than the predefined threshold value, the steps of:
assigning the predefined nationality having the highest nationality-based relevance score as a nationality of the input image; and
uploading the layout of the input image as a new layout associated with the corresponding nationality in the database.

2. The method as claimed in claim 1 further comprises:
detecting, by the nationality detection system, the nationality and the layout of the input image as the predefined nationality and the predefined layout of the predefined FD image corresponding to the highest first layout relevance score, when the highest first layout relevance score is greater than or equal to the predefined threshold value.

3. The method as claimed in claim 1 further comprises:
performing one or more operations of a financial institution by the nationality detection system upon detecting the nationality and the layout of the input image.

4. The method as claimed in claim 3, wherein the one or more operations of the financial institution are at least one of segregating the FDs, counting the FDs, identifying denomination of the FDs and eliminating soiled FDs.

5. The method as claimed in claim 1, wherein the one or more pre-processing steps comprises:
comparing, by the nationality detection system, the layout of the input image with the predefined layout corresponding to each of the one or more predefined FD images retrieved from the database;
for each of the one or more predefined FD images, computing, by the nationality detection system, the first layout relevance score based on the comparison; and
obtaining the highest first layout relevance score among the first layout relevance score of each of the one or more predefined FD images.

6. The method as claimed in claim 1, wherein the one or more extracted features comprises at least one of color histogram, color values, and edge detection.

7. The method as claimed in claim 1, wherein the input image is at least one of a complete image of the FD or a partial image of the FD.

8. The method as claimed in claim 1, wherein the predefined layout of each of the one or more predefined FD images is associated with a predefined nationality.

9. A nationality detection system comprising:
a processor; and
a memory (113) communicatively coupled to the processor, wherein the memory stores processor-executable instructions, which, on execution, causes the processor to:
receive an input image of a financial document (FD);
retrieve, from a database associated with the nationality detection system, one or more predefined FD images based on one or more extracted features of the input image, wherein each of the one or more predefined FD images is associated with a predefined nationality;
perform one or more pre-processing steps on each of the one or more predefined FD images to obtain a first layout relevance score for each of the one or more predefined FD images;
perform when a highest first layout relevance score, among the first layout relevance score for each of the one or more predefined FD images, is less than a predefined threshold value, steps of:
for each predefined nationality associated with each of the one or more predefined FD images, computing a nationality-based relevance score based on the first layout relevance score of each of the one or more predefined FD images;
comparing a layout of the input image with a predefined layout of each of the one or more predefined FD images corresponding to a predefined nationality having a highest nationality-based relevance score;
for each of the one or more predefined FD images of the predefined nationality having the highest nationality-based relevance score,
computing a second layout relevance score based on the comparison;
obtaining a highest second layout relevance score among the second layout relevance score of each of the one or more predefined FD images; and
detecting a nationality and the layout of the input image based on the predefined nationality and the predefined layout of a predefined FD image having the highest second layout relevance score, when the highest second layout relevance score is greater than or equal to the predefined threshold value;
repeat, when the highest second layout relevance score is less than the predefined threshold value, steps of
comparing, computing and detecting for predefined nationalities with subsequent highest nationality-based relevance score consecutively until a subsequent highest second layout relevance score corresponding to one of the predefined nationalities with the subsequent highest nationality-based relevance score is greater than or equal to the predefined threshold value;
perform, when the subsequent highest second layout relevance score corresponding to the predefined nationalities is less than the predefined threshold value, the steps of:
assigning the predefined nationality having the highest nationality-based relevance score as a nationality of the input image; and
uploading the layout of the input image as a new layout associated with the corresponding nationality in the database.

10. The nationality detection system as claimed in claim 9, wherein the processor further detects the nationality and the layout of the input image as the predefined nationality and the predefined layout of the predefined FD image corresponding to the highest first layout relevance score, when the highest first layout relevance score is greater than or equal to the predefined threshold value.

11. The nationality detection system as claimed in claim 9, wherein the processor further performs one or more operations of a financial institution upon detecting the nationality and the layout of the input image.

12. The nationality detection system as claimed in claim 11, wherein the one or more operations of the financial institution are at least one of segregating the FDs, counting the FDs, identifying denomination of the FDs and eliminating soiled FDs.

13. The nationality detection system as claimed in claim 9, wherein to perform the one or more pre-processing steps, the instructions cause the processor to:
compare the layout of the input image with a predefined layout corresponding to each of the one or more predefined FD images retrieved from the database;
for each of the one or more predefined FD images, compute the first layout relevance score based on the comparison; and
obtain the highest first layout relevance score among the first layout relevance score of each of the one or more predefined FD images.

14. The nationality detection system as claimed in claim 9, wherein the one or more extracted features comprises at least one of color histogram, color values, and edge detection.

15. The nationality detection system as claimed in claim 9, wherein the input image is at least one of a complete image of the FD or a partial image of the FD.

16. The nationality detection system as claimed in claim 9, wherein the predefined layout of each of the one or more predefined FD images is associated with a predefined nationality.

* * * * *